Patented Nov. 16, 1948

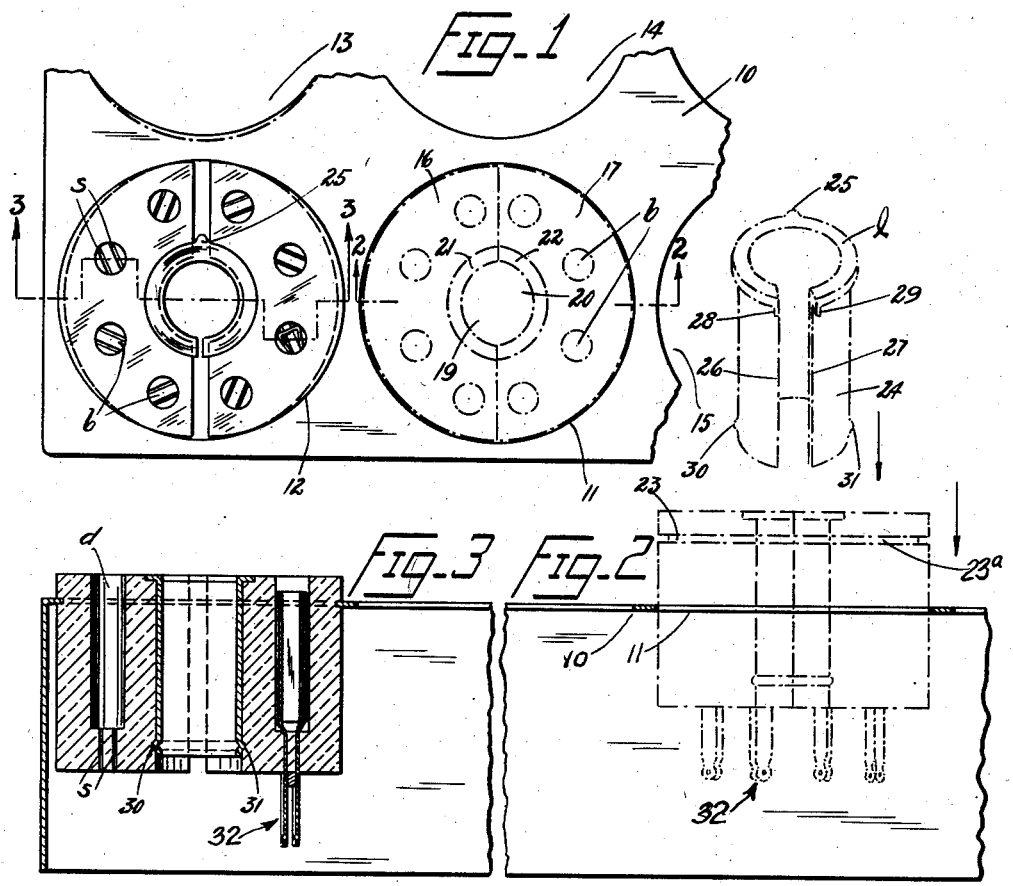

2,454,173

UNITED STATES PATENT OFFICE 2,454,173

TUBE SOCKET

William M. Hicks, Glen Head, N. Y.

Application July 28, 1945, Serial No. 607,535

2 Claims. (Cl. 173—328)

This invention relates to tube sockets such as are employed for example in positioning vacuum or electronic tubes.

Such tubes are employed in a great variety of devices many of which are desirably made as compactly as possible to require only a minimum of space. In many such devices, as for example in radio receiving sets and the like, where a number of tubes are employed the size of the device depends in part at least upon how closely together the tubes can be mounted in the device.

Heretofore it has been customary to provide a tube socket which is a unitary member having a shoulder against which is press fitted an annular retaining ring with two oppositely disposed, radially extending, projections or ears, punched to receive screws or other means by which the ring and its socket may be secured to a chassis in which the portion of the socket below the retaining ring may be inserted. The radially and outwardly extending projections or ears by which the prior art socket referred to has been secured in place require a substantial amount of space, in fact increasing the space required by the socket in the direction of the said projections by approximately sixty-six percent of the largest diameter of the body of the tube socket. The said projections or ears for the tube securing means thus require that the tubes be correspondingly spaced apart, and where a number of tubes are employed the additional space thus required is substantial, and has an important effect upon the necessary minimum size of the device in which they are employed.

It is an object of this invention to provide a tube socket which will require a minimum of space, and which may be grouped with other similar sockets to provide means for receiving a number of tubes grouped closely together and requiring only a limited space, making possible the reduction in size to a minimum of the device in which the tubes are employed.

Another object of the invention is to provide a simple, practical and effective tube socket.

Another object of the invention is to provide a tube socket comprising interchangeable parts whereby one damaged part may be replaced without replacing the whole unit.

Another object of the invention is to provide tube sockets which are easy to secure or remove from a supporting base or chassis.

Other objects will be in part obvious or in part pointed out hereinafter.

The invention accordingly consists in the features of construction, combinations of elements, arrangements of parts, and in the several steps and relation and order of each of said steps to one or more of the others thereof, all as will be pointed out in the following description, and the scope of the application of which will be indicated in the following claims.

The invention will best be understood if the following description is read in connection with the drawings, in which, Figure 1 is a top plan view of a portion of a base or chassis having a number of cut-outs to receive tube sockets, and showing, on the right as viewed by the reader, a plurality of socket members inserted in a cut-out before being finally positioned therein, and showing, at the left as viewed by the reader, the complete assembly operatively seated in a cut-out in the said chassis;

Figure 2 is a vertical section taken on the line 2—2 of Figure 1, and showing in addition a spring or expansion member about to be inserted in a central bore between two socket members to expand them outwardly into position in an opening or cut-out provided in a receiving base or chassis;

Figure 3 is a vertical section taken on the line 3—3 of Figure 1, showing an assembly after the said expansion or spring member has been inserted between the socket members and showing one vertical bore without, and another vertical bore with, a wire attachment member disposed therein.

The member 10, which may be a tube support means or chassis of any device employing vacuum tubes or the like is cut out at closely spaced intervals 11, 12, 13, 14, and 15, said cut outs being preferably of uniform size each adapted to receive therein a vacuum tube or the like to be positioned in the device of which the support or chassis 10 forms a part.

In the support aperture or cut out 11 of Figure 1 there is shown a socket comprising the members 16 and 17 which are preferably complementary, and are substantially semi-circular with the semi-cylindrical central bores or concavities 19 and 20 respectively, and in the top face of said socket members 16 and 17 respectively, surrounding said semi-cylindrical bores 19 and 20 respectively, the recesses or grooves 21 and 22 respectively, are provided to receive the top flange or lip 1 (L) of a spring expansion member 24 which is adapted to be compressed and inserted in the central bore or space provided between the socket members 16 and 17 when the latter have been initially inserted in a support or chassis cut out and when the parts are positioned as illustrated in the cut out 11 of Figure 1. Each of the socket members 16 and 17 is externally and similarly grooved at 23 and 23a respectively, the said grooves being of a width adapted to receive therein the edge portion of the support or chassis 10 surrounding a cut out. It will be understood that when a spring or expansion member 24 is inserted between the socket parts 16 and 17, in somewhat compressed condition, it will tend to expand outwardly and in so doing will force the parts 16 and 17 apart radially, and when the said parts are at the proper level within the cut out within which they are inserted the parts 16 and 17 will be forced apart sufficiently to cause opposite portions of the base or chassis 10 to enter the grooves 23 and 23a respectively, the said edge portions of the support or chassis 10 then being held in engagement in the said grooves by the force of said expansion member 24, and thus the socket parts are retained in position and are prepared to receive and disengageably hold the prongs of a vacuum tube or the like.

Each socket part 16 and 17 is provided with a number of bores d, illustrated herein as cylindrical in contour, which extend from the top surface of said members vertically part way through the socket members respectively, and from the bottom of each of said bores a plurality of slots s extend to the under face of said socket. The slots s may be disposed in parallel spaced relation or they may be angularly related to one another in any way desired.

Since the prongs of vacuum tubes and the like are spaced in a standard way, the bores d, which are adapted to receive the said prongs respectively are desirably disposed so that, when the socket parts 16 and 17 have been inserted within the support or chassis cut out which they are to occupy, and have been expanded by means such as spring expansion means 24 so that the grooves 23 and 23a thereof are firmly engaged with the edge portion of the support or chassis 10 surrounding the cut out, they will be spaced from one another circumferentially in a manner similar to the spacing of said tube prongs. To facilitate the ready obtaining of the desired spacing and to prevent slippage of one socket part in relation to another, the spring expansion member 24 is desirably provided with a vertically extending rib 25 positioned directly opposite, or angularly 180° removed from, the center of the vertical split or line of division between the edges 26 and 27 of the skirt of said expansion member 24. Thus the socket parts 16 and 17 are prevented from moving out of position toward one another in the direction of rib 25, and to similarly prevent the socket parts 16 and 17 from moving out of position toward one another in the direction of the space between the edges 26 and 27 of the skirt portion of expansion member 24 the ends of the lip 1 are turned down providing downwardly extending flanges or projections 28 and 29 to serve as stop means limiting the rotative movement of socket parts 16 and 17 relative to each other.

The socket parts 16 and 17 may desirably be identical and thus interchangeable, making it often possible to repair a socket by the substitution of a new socket part instead of requiring the substitution of a whole new socket. From the above description it will be apparent that the socket parts 16 and 17 may be quickly and readily inserted in a cut out in support means adapted to receive a socket and tube assembly, and the said parts may be readily engaged with, and supported by, the support means or chassis, without resort to attaching screws or the like, and the said socket parts may be correctly positioned and afterward retained in position, all by the insertion of compressible spring member 24, the entire operation requiring but a moment. To prevent accidental withdrawal of spring member 24 the outwardly extending projection or peripheral rib 30 is provided extending around the exterior face of member 24 preferably adjacent its lower end, said projection or rib being adapted to seat in the depression or groove 31 provided around the inner peripheries of said socket parts 16 and 17 respectively, as best shown in Figure 3. Preferably the member 24 is of less height than the socket assembly so that its lower end does not project below the lower end of the socket assembly and is therefore protected from being accidentally short-circuited with the wire terminal means employed, as by solder or the like which is commonly used in attaching wire terminals to the terminal members. Any suitable wire terminal members indicated generally by the numeral 32, may be employed, communicating with the bores d and projecting from the socket parts 16 and 17, and adapted to be engaged by wire terminals.

The socket assembly disclosed herein has the advantage that the various parts coact with other parts of the assembly to provide a solid, firmly held structure adapted to receive vacuum tubes and the like, and to make possible the grouping of two or more of said socket assemblies, and therefore of said tubes, within a minimum of space.

It will thus be seen that there has been provided by this invention an article in which the various objects hereinabove set forth together with many thoroughly practical advantages are successfully achieved. As various possible embodiments might be made of the mechanical features of the above invention and as the art herein described might be varied in various parts, all without departing from the scope of the invention, it is to be understood that all matter hereinbefore set forth or shown in the accompanying drawing is to be interpreted as illustrative and not in a limiting sense.

What I claim is:

1. A tube socket assembly comprising a plurality of semi-circular complementary parts having bores in one surface to receive the prongs of a tube, each part having a half round inner surface whereby said parts together define a central vertically extending bore in the said socket assembly, an external surface of said parts respectively being recessed to provide a space for receiving and engaging an edge portion of a base defining a cut-out to receive the socket assembly, and a compressible cylinder-like member split vertically and thus having opposed vertically extending free edges and consituting a spring adapted when compressed to be inserted in the said central bore of the socket assembly and to press against the inner surfaces of said parts respectively when released to cause said parts to move apart thereby seating the edge portions of the base in the said recesses of said parts respectively and holding said parts in such engagement with said base.

2. A tube socket assembly comprising a plurality of semi-circular complementary parts having bores in one surface to receive the prongs of a tube, each part having a half round inner surface whereby said parts together define a central vertically extending bore in the said socket assembly, an external surface of said parts respectively being recessed to provide a space for receiving and engaging an edge portion of a base defining a cutout to receive the socket assembly, and a compressible cylinder-like member split vertically and thus having opposed vertically extending free edges and constituting a spring adapted when compressed to be inserted in the said central bore of the socket assembly and to press against the inner surfaces of said parts respectively when released to cause said parts to move apart thereby seating the edge portions of the base in the said recesses of said parts respectively and holding said parts in such engagement with said base, said spring member having a lateral protuberance angularly removed 180° from its said free edges and adapted to project between the socket parts and to position and space them.

WILLIAM M. HICKS.

REFERENCES CITED

The following references are of record in the file of this patent:

UNITED STATES PATENTS

| Number | Name | Date |
| --- | --- | --- |
| 1,191,192 | Klein | July 18, 1916 |
| 1,586,348 | Allen | May 25, 1926 |
| 2,248,399 | Watts | July 8, 1941 |
| 2,277,637 | Eby | Mar. 24, 1942 |
| 2,361,187 | Foster | Oct. 24, 1944 |

FOREIGN PATENTS

| Number | Country | Date |
| --- | --- | --- |
| 262,226 | Great Britain | 1926 |
| 558,114 | Great Britain | Dec. 22, 1943 |